(12) United States Patent
West

(10) Patent No.: US 7,340,052 B1
(45) Date of Patent: Mar. 4, 2008

(54) MULTIFUNCTIONAL ELECTRONIC DEVICE

(76) Inventor: Mark L. West, 8 Glenwood Ave., Baltimore, MD (US) 21228

( * ) Notice: Subject to any disclaimer, the term of this patent is extended or adjusted under 35 U.S.C. 154(b) by 712 days.

(21) Appl. No.: 10/874,644

(22) Filed: Jun. 24, 2004

(51) Int. Cl.
*H04M 9/00* (2006.01)
*H04M 1/00* (2006.01)

(52) U.S. Cl. .................. 379/419; 379/428.03

(58) Field of Classification Search ........... 379/419, 379/144.01, 144.04
See application file for complete search history.

(56) References Cited

U.S. PATENT DOCUMENTS

| | | | |
|---|---|---|---|
| 5,218,633 A * | 6/1993 | Clagett et al. | ......... 379/144.04 |
| 5,657,378 A | 8/1997 | Haddock et al. | |
| 6,035,280 A | 3/2000 | Christensen | |
| 6,173,045 B1 | 1/2001 | Smith | |
| 6,259,449 B1 | 7/2001 | Saxena et al. | |
| 6,266,543 B1 | 7/2001 | Chen | |
| D449,287 S | 10/2001 | Jauregui et al. | |

* cited by examiner

*Primary Examiner*—Curtis Kuntz
*Assistant Examiner*—Phylesha L Dabney

(57) ABSTRACT

A device for providing telephone communication and data transfer includes a base unit with a display screen and means for retrieving and displaying Internet information via a DSL connection or USB line, for example. A mechanism for recognizing and verifying handwriting is included for allowing a user to sign his/her name to confirm or validate a sales transaction. A voice recognition mechanism converts and translates speech input to text wherein a hearing-impaired user can read real time text messaging. A mechanism for providing access to an electronic phone directory via a CD ROM drive is also provided. The present invention further includes a handset for allowing a user to communicate via a plain old telephone system. Advantageously, an infrared mechanism for communicating with a portable electronic device is provided wherein a variety of devices employing either infrared or fiber-optic communication technology can send and receive wireless signals to the device.

20 Claims, 2 Drawing Sheets

MULTIFUNCTIONAL ELECTRONIC DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a telephone and, more particularly, to a multifunctional telephone including an electronic directory.

2. Prior Art

A telephone having a display screen, a telephone keypad, and a telephone handset is known, and it sometimes is referred to as a "screen phone". Several companies provide such a telephone. These screen phones generally look like conventional telephones except they have the display screen which typically is located above the keypad. Some screen phones have an alphanumeric keyboard.

With the advent of the modem and other network interface devices, the personal computer has evolved from a personal productivity device to a communications gateway. Presently, different communication applications for personal and workplace telephones are available as several separate devices, which the user is forced to learn. For example, a user may use one device for phone calls, a separate device for web access, and a third device for printing documents.

Each year, hundreds of millions of telephone books are reprinted for distribution to households and businesses around the world. Consequently, an enormous amount of energy and natural resources are consumed in order to revise a relatively small amount of information. A telephone device that would allow a user to store telephone numbers or allow internet access to look up a number would be advantageous in cutting back on production of often seldom used phonebooks.

In the prior art, discount coupons may be distributed using direct mailing techniques, printed in newspapers, magazines, or the like, distributed with other commercial goods. Such techniques require massive amounts of printing and distribution, and historically have a low response rate. Thus, such mass-distribution techniques may not be cost effective, and are not environmentally friendly, due to the large amount of paper wasted. A multifunctional device that would be able to print these coupons would, again, be advantageous to the environment by cutting back on production of paper products.

Accordingly, a continuing need remains for a multifunctional telephone including an electronic directory.

BRIEF SUMMARY OF THE INVENTION

In view of the foregoing background, it is therefore an object of the present invention to provide a multifunctional electronic device. These and other objects, features, and advantages of the invention are provided by an electronic device for providing telephony communication and data transfer that includes a base unit having a top surface and a plurality of integral sides defining a substantially rectangular shape. Such a base unit includes a display screen pivotally connected to the top surface and is movable between raised and lowered positions. The display screen further includes a user interface for listing telephone numbers unique to select entities.

The base unit further includes a menu display screen disposed adjacent the display screen including output circuitry for providing a list of functions and options related to the user interface of the display screen. Advantageously, the present invention preferably includes a mechanism for retrieving and displaying Internet advertisement data and coupons on the display screen.

The present invention further includes a key pad disposed on the top surface including input circuitry for generating and sending a signal to the output circuitry based upon a user input, as well as a plurality of buttons including integrated circuitry operably connected to the menu display screen for allowing a user to selectively toggle between the list of functions and options.

Advantageously, the present invention further includes a mechanism for transmitting and receiving data over a digital subscriber line so that a user can access the Internet. A mechanism for transmitting and receiving data over a USB line so that a user can communicate with a peripheral device, is also provided. Such a USB line mechanism includes an integrated USB port disposed at one side of the base unit.

The present invention may further include a printer operably coupled to the USB line mechanism that cooperates with the Internet mechanism so that a user can print Internet advertisements and coupons from the base unit. Furthermore, the present invention may further include a mechanism for recognizing and verifying handwriting so that a user can purchase goods and services from a remote location. Such a handwriting mechanism includes a user interface operably coupled to the USB line mechanism.

Advantageously, the present invention further includes a mechanism for uploading and displaying data on the display screen so that a user can access a phone directory. Such a data mechanism preferably includes a CD ROM drive disposed along one the plurality of sides and includes integrated circuitry for communicating with the display screen user interface.

The present invention further includes a telephone handset operably connected to the base unit for allowing a user to communicate via a plain old telephone system (POTS). Of course, such a headset may include corded and as well as cordless headsets, as well know in the art.

The present invention may further include an infrared mechanism for communicating with a cellular phone. Such an infrared mechanism is preferably disposed adjacent the USB line mechanism along the one side of the base unit. At least one smart card is removably attachable to the base unit via the USB line mechanism for providing a frequency card so that a user can store all or a portion of information provided by the data mechanism. Advantageously, the present invention further includes a voice recognition mechanism for allowing a hearing-impaired user to identify data illustrated on the display mechanism so that a select telephone listing can be quickly identified.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
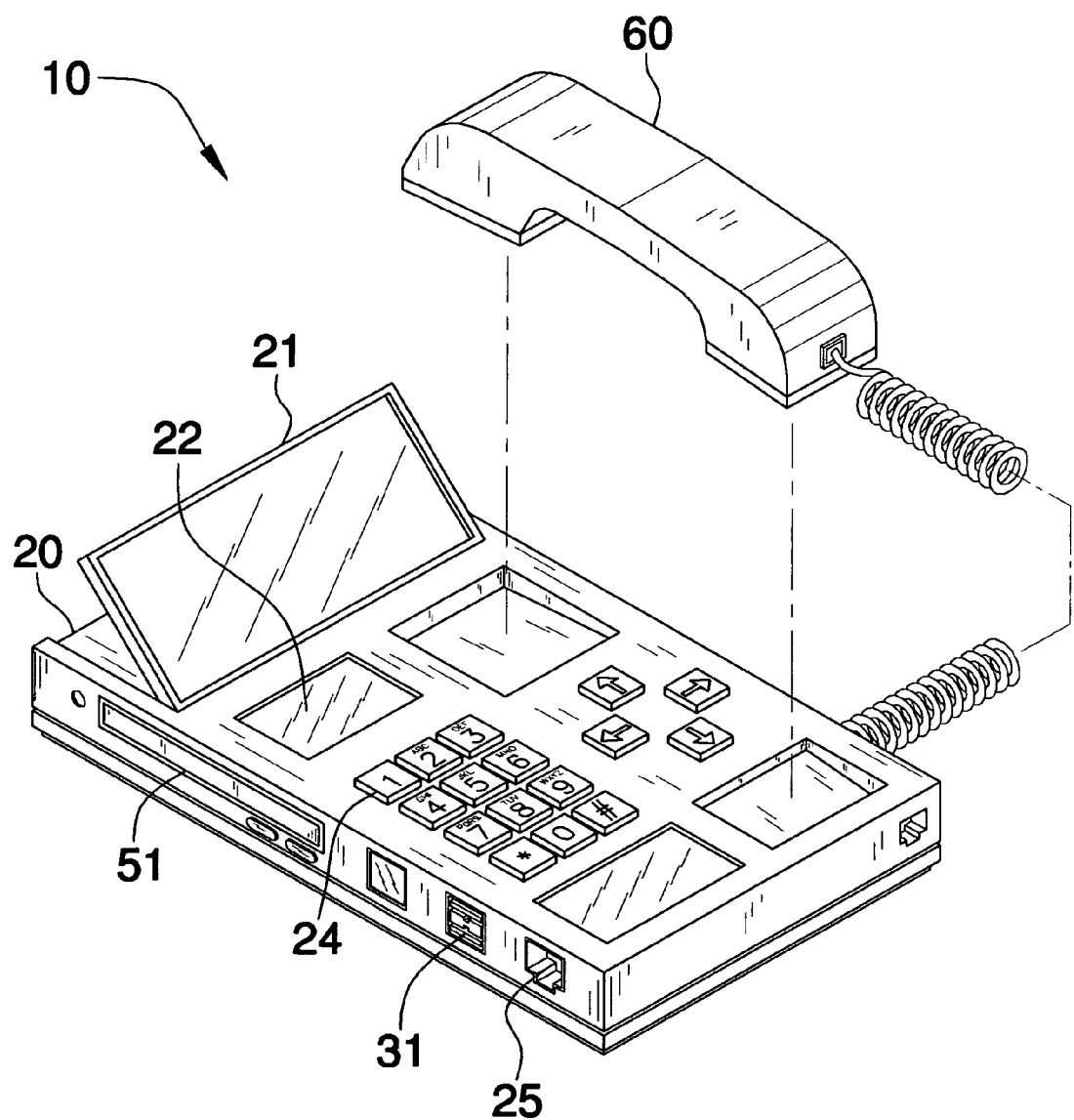
FIG. 1 is a perspective view showing a multifunctional electronic device, in accordance with the present invention.
Figure 2:
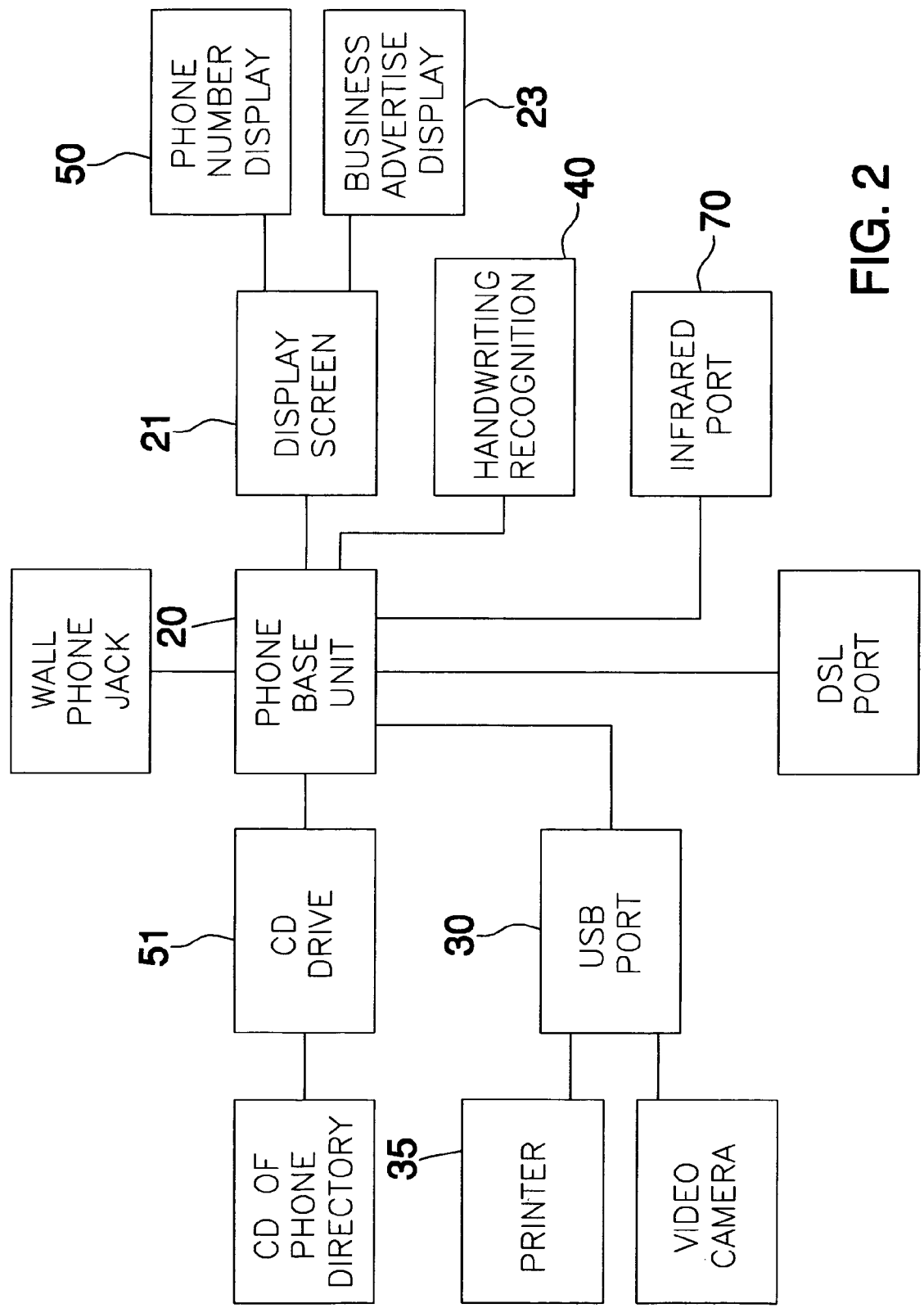
FIG. 2 is a schematic block diagram showing the various components comprising a preferred embodiment of the present invention.

The device of this invention is referred to generally in FIGS. 1 and 2 by the reference numeral 10 and is intended to provide a multifunctional telephone including an electronic directory. It should be understood that the device 10 may be used to communicate and transfer data in a variety of ways using several different components.

Referring initially to FIG. 1, the device 10 includes a base unit 20 having a top surface and a plurality of integral sides defining a substantially rectangular shape. Such a base unit 20 includes a display screen 21 pivotally connected to the top surface and is movable between raised and lowered positions. The display screen 21 further includes a user interface for listing telephone numbers unique to select entities.

The base unit 20 further includes a menu display screen 22 disposed adjacent the display screen 21 including output circuitry for providing a list of functions and options related to the user interface of the display screen 21. Advantageously, the present invention preferably includes a mechanism 23 for retrieving and displaying Internet advertisement data and coupons on the display screen 21.

The present invention further includes a key pad 24 disposed on the top surface including input circuitry for generating and sending a signal to the output circuitry based upon a user input, as well as a plurality of buttons including integrated circuitry operably connected to the menu display screen 22 for allowing a user to selectively toggle between the list of functions and options.

Referring to FIG. 2, the present invention advantageously includes a mechanism 25 for transmitting and receiving data over a digital subscriber line so that a user can access the Internet. The direct DSL connection could aid in the completion of telephone or Internet sales and credit card authorizations. A mechanism 30 for transmitting and receiving data over a USB line so that a user can communicate with a peripheral device is also provided. Such a USB line mechanism 30 includes an integrated USB port 31 disposed at one side of the base unit 20. The USB port 31 allows for connection of optional devices such as a video camera or flash memory card.

The present invention may further include a printer 35 operably coupled to the USB line mechanism 30 that cooperates with the Internet mechanism 25 so that a user can print Internet advertisements and coupons from the base unit 20. Furthermore, the present invention may further include a mechanism 40 for recognizing and verifying handwriting so that a user can purchase goods and services from a remote location. Such a handwriting mechanism 40 includes a user interface operably coupled to the USB line mechanism 30.

Advantageously, the present invention further includes a mechanism 50 for uploading and displaying data on the display screen 21 so that a user can access a phone directory. Such a data mechanism 50 preferably includes a CD ROM drive 51 disposed along one of the plurality of sides and includes integrated circuitry for communicating with the display screen 21 user interface. A CD is provided, which contains both local and nationwide listings for residential as well as commercial entities.

Such listings can be conveniently accessed on the display screen 21 after a user provides input via the key pad 24 or voice-recognition software. For example, a user may simply input a specific listing or speak the name of a person or business entity within a desired territory. Mechanism 50 will then display the relevant phone numbers on screen 21 or verbally project such phone numbers via audio speakers. The voice-recognition software may also provide screen readout capabilities so that a user does not need to transmit data to a printer.

The present invention further includes a telephone handset 60 operably connected to the base unit 20 for allowing a user to communicate via a plain old telephone system (POTS). Of course, such a handset 60 may include corded and as well as cordless headsets, as well know in the art.

The present invention may further include an infrared mechanism 70 for communicating with a variety of portable, hand-operable devices compatible such as Palm Pilots, GPS navigators, cellular phones and other conventional devices well known in the industry. Such devices may operate via fiber-optic technology wherein thin transparent fibers of glass or plastic transmit light through their length by internal reflections, commonly used for transmitting data, voice, and images.

Fiber-optic technology has virtually replaced copper wire in long-distance telephone lines and is used to link computers in local area networks, with digitized light pulses replacing the electric current formerly used for the signal. Telecommunication using fiber optics is usually conducted with infrared light. Fiber optics uses light in the visible wavelengths to transmit images directly, in various technical devices such as those listed hereinabove.

Infrared mechanism 70 may be interfaced with conventional fiber optic devices for transmitting data signals therebetween, as well known to a person of ordinary skill in the art of electronics. Such an infrared mechanism 70 is preferably disposed adjacent the USB line mechanism 30 along the one side of the base unit 20. At least one smart card is removably attachable to the base unit 20 via the USB line mechanism 30 for providing a frequency card so that a user can store all or a portion of information provided by the data mechanism 50.

Advantageously, the present invention further includes a voice recognition mechanism (not shown) for allowing a hearing-impaired user to identify data illustrated on the display mechanism 21 so that a select telephone listing can be quickly identified. Also, when a hearing-impaired user is speaking on the telephone with another person, the voice recognition mechanism is able to accept speech input and transcribe it into written language wherein it is displayed on the display mechanism in real time. Conventional software for automatic speech recognition (ASR) can be employed by the present invention, wherein the goal is to transform the content of speech into literary expressions.

The present invention offers the advantage of being able to easily search for a telephone number located in the electronic directory. The multifunctional capability of the present invention also allows a user to have more available desk space by cutting out the need for a separate phone directory and providing internet access.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

The invention claimed is:

1. An electronic device for providing telephony communication and data transfer, said device comprising:
   a base unit having a top surface and a plurality of integral sides defining a substantially rectangular shape, said base unit comprising
      a display screen pivotally connected to said top surface and movable between raised and lowered positions, said display screen including a user interface for listing telephone numbers unique to select entities,
      a menu display screen disposed adjacent said display screen and including output circuitry for providing a list of functions and options related to said user interface of said display screen,
      a key pad disposed on said top surface and including input circuitry for generating and sending a signal to said output circuitry based upon a user input,
      a plurality of buttons including integrated circuitry operably connected to said menu display screen for allowing a user to selectively toggle between the list of functions and options,
      means for transmitting and receiving data over a digital subscriber line so that a user can access the Internet,
      means for transmitting and receiving data over a USB line so that a user can communicate with a peripheral device,
      means for uploading and displaying data on said display screen so that a user can access a phone directory, said data means comprising a CD ROM drive disposed along one said plurality of sides and including integrated circuitry for communicating with said display screen user interface, and
      a telephone handset operably connected to said base unit for allowing a user to communicate via a plain old telephone system (POTS).

2. The electronic device of claim 1, further comprising: means for retrieving and displaying Internet advertisement data and coupons on said display screen.

3. The electronic device of claim 2, further comprising: a printer operably coupled to said USB line means and cooperating with said Internet means so that a user can print Internet advertisements and coupons from said base unit.

4. The electronic device of claim 1, further comprising: means for recognizing and verifying handwriting so that a user can purchase goods and services from a remote location, said handwriting means including a user interface operably coupled to said USB line means.

5. The electronic device of claim 1, wherein said USB line means comprises: an integrated USB port disposed at said one side of said base unit.

6. The electronic device of claim 5, further comprising: infrared means for communicating with a portable electronic device, said infrared means being disposed adjacent said USB line means along said one side of said base unit.

7. The electronic device of claim 1, further comprising: at least one smart card removably attachable to said base unit via said USB line means for providing a frequency card so that a user can store all or a portion of information provided by said data means.

8. The electronic device of claim 1, further comprising: voice recognition means for allowing a hearing-impaired user to identify data illustrated on said display means so that a select telephone listing can be quickly identified.

9. An electronic device for providing telephony communication and data transfer, said device comprising:
   a base unit having a top surface and a plurality of integral sides defining a substantially rectangular shape, said base unit comprising
      a display screen pivotally connected to said top surface and movable between raised and lowered positions, said display screen including a user interface for listing telephone numbers unique to select entities,
      a menu display screen disposed adjacent said display screen and including output circuitry for providing a list of functions and options related to said user interface of said display screen,
      a key pad disposed on said top surface and including input circuitry for generating and sending a signal to said output circuitry based upon a user input,
      a plurality of buttons including integrated circuitry operably connected to said menu display screen for allowing a user to selectively toggle between the list of functions and options,
      means for transmitting and receiving data over a digital subscriber line so that a user can access the Internet,
      means for transmitting and receiving data over a USB line so that a user can communicate with a peripheral device,
      means for uploading and displaying data on said display screen so that a user can access a phone directory, said data means comprising a CD ROM drive disposed along one said plurality of sides and including integrated circuitry for communicating with said display screen user interface,
      a telephone handset operably connected to said base unit for allowing a user to communicate via a plain old telephone system (POTS), and
      means for retrieving and displaying Internet advertisement data and coupons on said display screen.

10. The electronic device of claim 9, further comprising: a printer operably coupled to said USB line means and cooperating with said Internet means so that a user can print Internet advertisements and coupons from said base unit.

11. The electronic device of claim 9, further comprising: means for recognizing and verifying handwriting so that a user can purchase goods and services from a remote location, said handwriting means including a user interface operably coupled to said USB line means.

12. The electronic device of claim 9, wherein said USB line means comprises: an integrated USB port disposed at said one side of said base unit.

13. The electronic device of claim 12, further comprising: infrared means for communicating with a portable electronic device, said infrared means being disposed adjacent said USB line means along said one side of said base unit.

14. The electronic device of claim 9, further comprising: at least one smart card removably attachable to said base unit via said USB line means for providing a frequency card so that a user can store all or a portion of information provided by said data means.

15. The electronic device of claim 9, further comprising: voice recognition means for allowing a hearing-impaired user to identify data illustrated on said display means so that a select telephone listing can be quickly identified.

16. An electronic device for providing telephony communication and data transfer, said device comprising:
- a base unit having a top surface and a plurality of integral sides defining a substantially rectangular shape, said base unit comprising
    - a display screen pivotally connected to said top surface and movable between raised and lowered positions, said display screen including a user interface for listing telephone numbers unique to select entities,
    - a menu display screen disposed adjacent said display screen and including output circuitry for providing a list of functions and options related to said user interface of said display screen,
    - a key pad disposed on said top surface and including input circuitry for generating and sending a signal to said output circuitry based upon a user input,
    - a plurality of buttons including integrated circuitry operably connected to said menu display screen for allowing a user to selectively toggle between the list of functions and options,
    - means for transmitting and receiving data over a digital subscriber line so that a user can access the Internet,
    - means for transmitting and receiving data over a USB line so that a user can communicate with a peripheral device,
    - means for uploading and displaying data on said display screen so that a user can access a phone directory, said data means comprising a CD ROM drive disposed along one said plurality of sides and including integrated circuitry for communicating with said display screen user interface,
    - a telephone handset operably connected to said base unit for allowing a user to communicate via a plain old telephone system (POTS), and
    - means for retrieving and displaying Internet advertisement data and coupons on said display screen; and
- a printer operably coupled to said USB line means and cooperating with said Internet means so that a user can print Internet advertisements and coupons from said base unit.

17. The electronic device of claim 16, further comprising: means for recognizing and verifying handwriting so that a user can purchase goods and services from a remote location, said handwriting means including a user interface operably coupled to said USB line means.

18. The electronic device of claim 16, further comprising: infrared means for communicating with a portable electronic device, said infrared means being disposed adjacent said USB line means along said one side of said base unit.

19. The electronic device of claim 16, further comprising: at least one smart card removably attachable to said base unit via said USB line means for providing a frequency card so that a user can store all or a portion of information provided by said data means.

20. The electronic device of claim 16, further comprising: voice recognition means for allowing a hearing-impaired user to identify data illustrated on said display means so that a select telephone listing can be quickly identified.

* * * * *